United States Patent [19]

Bucklew

[11] 4,340,249

[45] Jul. 20, 1982

[54] JAR STABILIZER FOR PICK-UP ASSEMBLY

[75] Inventor: Leonard E. Bucklew, Houston, Tex.

[73] Assignee: General Foods Corporation, White Plains, N.Y.

[21] Appl. No.: 186,374

[22] Filed: Sep. 12, 1980

[51] Int. Cl.³ .............................................. B66C 1/54
[52] U.S. Cl. ........................................ 294/95; 294/88
[58] Field of Search .............. 294/86.25, 87 R, 87.22, 294/88, 93–97, 116; 198/694, 696; 269/48.1; 279/2 R, 2 A; 414/416, 753

[56] References Cited

U.S. PATENT DOCUMENTS

| | | |
|---|---|---|
| 3,075,800 | 1/1963 | Rowekamp .................. 294/95 X |
| 4,154,350 | 5/1979 | Frohn ........................... 294/95 X |
| 4,199,183 | 4/1980 | Hecker ........................... 294/97 |

FOREIGN PATENT DOCUMENTS 1027066  4/1966  United Kingdom ................. 294/97

Primary Examiner—Johnny D. Cherry
Attorney, Agent, or Firm—Daniel J. Donovan; Bruno P. Struzzi; Thomas V. Sullivan

[57] ABSTRACT

A jar pick-up assembly having a plurality of pivotal fingers insertable into the mouth of a jar when in a closed retracted condition and expandable within the jar to engage interior jar surfaces is provided with an annular stabilizing member adapted to bear on an exterior surface area of the jar and in cooperation with said fingers to grip the jar in clamp-like fashion as the jar is being lifted and carried from one location to another.

7 Claims, 3 Drawing Figures

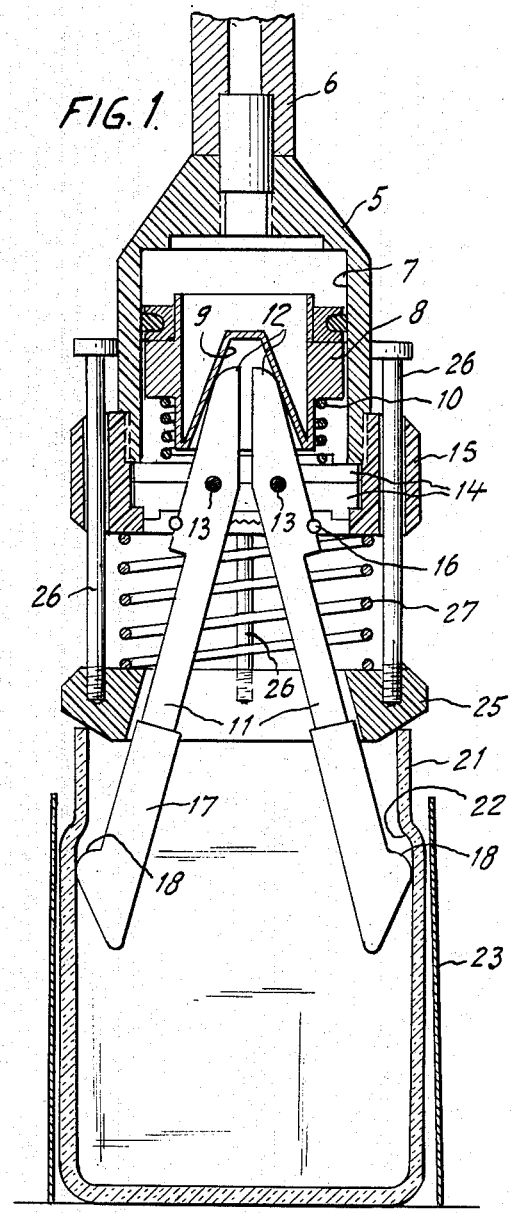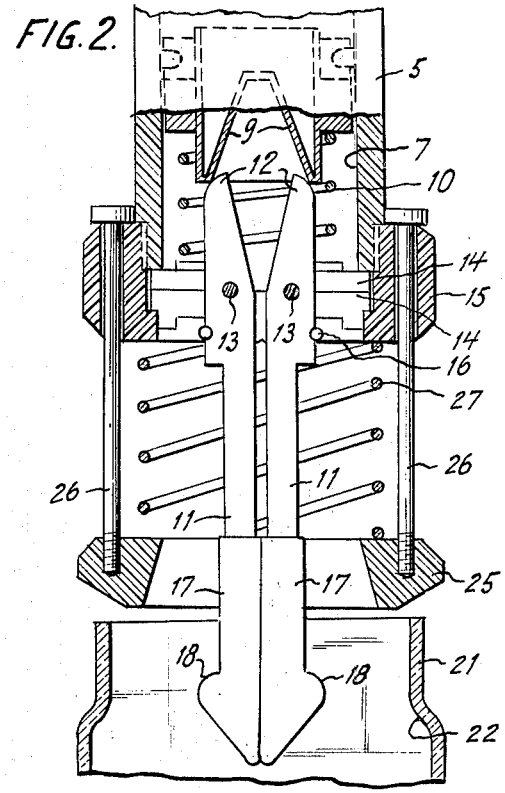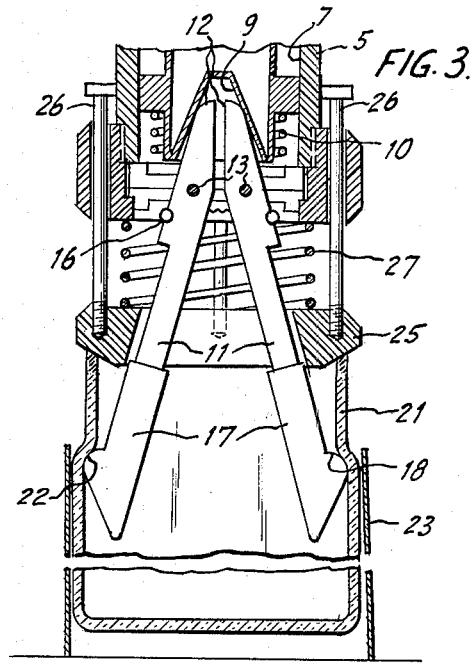

JAR STABILIZER FOR PICK-UP ASSEMBLY

BACKGROUND OF THE INVENTION

1. Field of the Invention

This invention relates generally to article handling apparatus of the type employed in the transferral of open mouth containers, such as jars, from a shipping carton or case to an appropriate receiving station associated with a conveyor or the like in what may be referred to as a carton unloading operation. More particularly, the invention relates to the individual jar pick up means or assembly, of which there is one for each jar of a case, carried by a transfer head of the apparatus which operate to grip the respective jars so as to enable the jars to be picked up or lifted vertically out of the case during the course of an unloading operation.

A shipping case or carton of jars to be unloaded may contain twenty four or more jars which are normally arranged upright in side-by-side relation to each other and in rows with a typical twenty four jar carton presenting a four by six array. When in the carton the jars are closely packed and separated from one another only by case dividers of relatively thin material such a corrugated board or the like which prevents contact between the jars and possible damage thereto during shipment and handling. In unloading such a case of jars, simultaneously, by apparatus operating at high speeds, it is important that the jars which now no longer have dividers between them be held in a stable aligned relationship to the pick-up head with sufficient firmness as to prevent a jar from hitting or contacting an adjacent jar and causing possible damage thereto.

This problem is especially serious in instances where wide mouth jars are involved because due to the closeness of the neck or finish of a wide mouth jar to that of an adjacent jar contact between jars at the finish is possible, and any such contact or impact which resulted in a crack or chip at the threaded neck portion would render the jar defective since it would be unable to maintain a proper seal. This problem would not be as prevalent if it were feasible to provide jar gripping means which engage the outer surface of the neck or finish portion of the jar, but in the case of wide mouth jars the spacing between adjacent jars is limited thereby rendering it practically necessary to grip the jar on the inside surface thus exposing the outer surface of the threaded neck or finish to damaging contact with an adjacent jar. It is to the solution of this problem involved in the unloading of wide mouth jars that the present invention is directed.

2. Discussion of the Prior Art

U.S. Pat. No. to Rowekamp 3,075,800 discloses a jar pick up assembly of a type for which the present invention is adaptable. The device of this patent employs a pair of pivotally mounted pick up fingers which are rockable from a closed retracted position to an open expanded position. The fingers depend from the assembly and are lowered into the mouth of a jar when in the closed retracted position. Once in the jar and below a bead on the interior surface thereof, the fingers are opened or expanded into frictional contact with the interior jar wall. As the assembly is then lifted the fingers eventually engage the interior bead and lift the jar vertically out of the case or carton. The jar in effect rests on a surface portion of the fingers and is subject to tilting, rocking or axial displacement for whatever reason since it is not firmly gripped or clamped by mechanism operating in conjunction with the fingers to maintain jar stability and orientation by firmly gripping it in a clamp like manner.

U.S. Pat. No. to Haverbusch 4,173,368 discloses another pick up assembly for use with wide mouthed jars and employing a plurality of flexible straps which when longitudinally extended are lowered into the mouth of a jar and then are longitudinally contracted causing them to flex outwardly and in so doing frictionally engage the interior surface of the jar. The jar is supported merely by frictional resistance supplied by the expanded straps, and it is not gripped in the manner of a clamp so as to hold it firmly stable and in properly aligned relation to the pick-up head.

U.S. Pat. No. to Krupp, et al., 2,818,987 discloses a somewhat similar pick up assembly utilizing a flexible rubber cup which in the longitudinally extended condition is inserted into the mouth of a jar. Thereafter, the cup is longitudinally contracted causing the side walls thereof to bulge outwardly and make frictional contact with the interior surface of the jar. There is no means provided cooperating with the cups of gripping the jar in a clamp-like manner.

U.S. Pat. No. to Brubaker, 3,314,714 discloses a jar holder which employs a plurality of flexible fingers circumferentially arranged and adjusted so as to define a circumferential pattern having a diameter slightly larger than that of the mouth of the jar. The fingers are forced through the mouth of the jar which is accomplished by the inward flexing thereof, and once inside the jar they expand to their preset condition into frictional engagement with the interior surface of the jar. The jar is merely supported frictionally by said fingers, and although there is a cover member which is brought into contact with the top surface or finish of the jar, it merely rests thereon and does not perform any gripping or clamping function in cooperation with the fingers. Moreover, there is no means shown for automatically retracting the fingers within the jar to enable easy disengagement of the device from the jar, which disengagement can only be accomplished by again forcing the fingers through the smaller dimensioned mouth of the jar. The jar must be held by hand or some other means in order for the fingers to be withdrawn therefrom.

U.S. Pat. No. to Manganelli, 3,977,687 discloses a holder for hollow cylindrical articles which includes a plurality of resilient fingers which are able to receive a container when presented thereto in slightly misalignment and to support said container in proper aligned and stable position when fully seated thereon. The device does not lift the container nor does it have means for retracting and extending said fingers nor does it grip the container in a clamp-like manner.

SUMMARY OF THE INVENTION

The device in accordance with the present invention is designed to meet the aforesaid problems encountered in the unloading of wide mouth jars by provision of means bearing on an exterior surface portion of the jar and cooperating with pick-up or lifting fingers or the like, engaging the interior surface of a jar, to achieve a clamp-like yielding but firm grip thereon capable of achieving jar alignment, stability, and freedom of contact with other jars adjacent thereto. The means engaging the external surface of the jar includes a stabilizing ring or annular member having a diameter substantially the same as that of the mouth of the jar and disposed around the fingers which engage the interior surface of the jar. Said ring is supported in axial alignment with the housing of the assembly by a plurality of pins threaded therein and slide fitted in holes bored through a part of the assembly housing so as to enable the ring to be displaceable relative to the housing against the resistance of a compression spring appropriately seated and positioned there-between. Said ring when in its normal fully extended relationship to the housing is disposed in a position such as to engage the exterior surface of said jar at its finish or rim area while the fingers are being lowered within the jar and before the fingers reach their lower limit and are opened or expanded to engage the interior jar surfaces. During this continued lowering movement of the assembly, the lowering of the ring is restrained by its engagement with the rim or finish of the jar which has the affect of displacing the ring axially and inwardly toward the housing of the assembly against the resistance of the associated compression spring. After the fingers have engaged the interior surface of the jar and the assembly starts to rise, the stabilizing ring which is now spring loaded holds the jar firmly in place until the fingers ride up to a point where protruding pik-up or lifting nose formations thereon make contact with an interior jar shoulder area at which point the actual withdrawal of the jar commences with the stabilizing ring still maintaining a downward pressure on the jar. This pressure holds the jar shoulder firmly seated on the lifting nose surface of the fingers and in effect the ring acts in cooperation with the fingers to yieldingly grip the jar as it is being lifted throughout the ensuing movement thereof while it is being transferred to an appropriate receiving station. In the event a jar may be slightly tilted while in the shipping case so that its top area or finish is not absolutely level or horizontal, this condition will be corrected by the ring upon being lowered into contact with the jar unless the condition is due to some obstruction or foreign matter beneath the jar which would prevent levelling as long as the jar remains in the carton. In this latter situation, the correction would occur as soon as the jar begins to be lifted by reason of the force or pressure exerted by the stabilizing ring on the finish of the jar to assure that the shoulder area thereof is firmly seated against the cooperating lifting nose portion of the lifting fingers which thereby assures that the jar is in properly axially aligned relationship with the pick-up assembly.

It is therefore an object of the invention to achieve greater stability among jars while being handled by automatic case unloading apparatus.

It is a further object of the invention to enable a case of open mouth jars to be simultaneously unloaded from a shipping case and transferred to a receiving station with minimal risk of being damaged by reason of contact there-between.

It is a still further object of the invention to improve the pick-up means of case unloading apparatus by provision of gripping means which perform a clamping function by a member engaging the interior surface of a jar in cooperation with a member engaging the exterior surface of a jar.

BRIEF DESCRIPTION OF THE DRAWING

Further objects of the invention together with the features contributing thereto and the advantages accruing therefrom will be apparent from the following description when read in conjunction with the drawing wherein:

FIG. 1 is a view in vertical section of a pick-up assembly for a wide mouth jar in accordance with the invention after being fully lowered into the jar and with the pick-up fingers expanded preparatory to lifting.

FIG. 2 is a sectional view of the same while being lowered into the jar preparatory to lifting and with the pick-up fingers contracted.

FIG. 3 is a fragmentary sectional view showing the gripping action of the mechanism on the jar while being lifted and transported thereby.

The invention is shown herein in an embodiment adapted for use with a pick-up assembly of the type shown and disclosed in the aforementioned patent to Rowekamp U.S. Pat. No. 3,075,800. Many of the parts of the basic pick up assembly structure shown herein are the same as or similar to that shown and described in the aforesaid patent. Accordingly, for further description of the structure and operation of the basic assembly, without the stabilizing feature of the instant invention associated therewith, reference may be had to the aforesaid patent.

The assembly, of which there is one provided for each jar in a case to be unloaded, includes a generally cylindrical body 5 in the form of a shell which is attached by a threaded coupling to the lower end of a slightly flexible tube or hose 6. The other upper end of the hose is attached to the manifold of a pick-up head, not shown, providing a source of compressed air to the interior of the body through the tube and a bored passage through the upper portion thereof in communication therewith.

Mounted within the body 5 in sliding engagement with the interior cylindrical wall 7 thereof is a piston 8 or actvator which is driven downwardly at an appropriate time in the cycle of operation by the release of compressed air into the manifold. The underside of the piston 8 is recessed in a frusto-conical shape which accommodates the upper extremities of a pair of jar pick-up or lifting fingers 11. The upper extremities of said fingers are rounded off to provie cam shoulders 12 which bear on the inwardly tapering sides 9 of the frusto-comical recess in the piston which rotate the fingers by a camming action to a jar engaging position when the piston 8 is driven downwardly under the influence of compressed air in said manifold. The fingers are pivotally supported on pivot pins 13, the ends of which are supported between opposed pairs of semi-circular disks 14, one pair shown, the disks of each pair being suitably recessed, not shown, at their interface to accommodate the ends of said pins. A compression spring 10 seated between the upper disk 14 of each pair and a shoulder on the piston 8 serves to return the piston to its upper unactivated position within the body shell 5 when the compressed air is turned off, thus enabling the fingers to return to a normal deactivated and retracted position under the influence of a coil spring 16 stretched around the fingers at a point slightly below the pivots 13. The lower disk 14 of each pair is seated on an internal flange of a collar 15 which is attached, preferably by threaded engagement, to the lower skirt portion of the body member 5, which collar serves to hold the parts within the body member in proper assembled relationship.

The lower extremities of the fingers 11 are preferably covered by a jacket or a sheath 17 of a non-abrasive substance such as plastic or the like, so as to avoid scratching the interior surfaces of the jars 21 which are arranged in the shipping case in individual compartments defined by dividers 23. The lower tip of each finger is generally pointed with the outer edge from each point leading to a curved protuberance constituting a pick-up or lifting nose 18 designed to make gripping engagement with a shoulder 22 in the side wall of the jar. When the fingers are in the closed or retracted position shown in FIG. 2, they jointly present a general arrow-headed configuration which tends to assure their free penetration through the mouth of a jar even when a jar may be substantially misaligned with respect to the pick up assembly.

In operation, as is also described in the aforesaid U.S. Pat. No. 3,075,800, when the pick-up assembly is lowered in to jar engaging position, the compressed air supply to the pick up head manifold is shut off thus placing the pick-up fingers in their closed retracted condition as shown in FIG. 2. The assembly is lowered a sufficient distance to bring the nose 18 of the fingers slightly below the level of the jar shoulders 22. At this point the compressed air supply to the head manifold is turned on to rock the fingers to their open expanded position as shown in FIG. 1 wherein the noses 18 bear against the interior wall surface of the jar. As the pick-up assembly starts to rise, the noses ride up the surface of the jar until reaching the shoulder 22 at which point the jar is carried along and lifted out of the case. In the event the jar is slightly tilted such as is shown in FIG. 2, and lacking the stabilizing means hereafter described, the nose of only one finger will engage the shoulder without engagement by the other finger, a condition which due to the frictional forces involved may continue to exist as the jars are lifted out of the case, thus giving rise to possible contact between the side surfaces of the jars after they are removed from the case and while being transferred to another location. In the event an adjoining jar should happen to be tilted in the opposite direction, the possibility would exist that said jars could make damaging contact and collide in the neck or finish area. Even with a jar completely seated with respect to both fingers, it merely rests on the noses of the respective lifting fingers and is subject to rocking motion about its fulcrum point of contact with the fingers under the influence of forces, which may be centrifugal or otherwise, encountered during their rapid transfer from the case to the ultimate destination.

The means for rendering the jars more stable and thus preventing damage thereto during an unloading operation, in accordance with the present invention, includes an annular member or ring 25 having a diameter substantially equal to that of the mouth of the jar and encompassing the lower extremities of the pick up fingers 11 at a predetermined point above the pick-up noses 18 on the fingers. The ring is disposed in a horizontal plane and is carried by a plurality of headed pins 26 slide fitted in holes extending through the collar 15. A compression spring 27 fitted between the lower surface of the collar and the upper surface of the ring retains the ring in its lower-most extended or limit position, the position shown in FIG. 2, with the head of the pins seated against the top surface of the collar 15. When in its extended limit position, the axial distance between the bottom surface of the ring and the noses 18 of the fingers is somewhat less than the axial distance from the jar finish to the jar shoulder 22. Thus, as the assembly is lowered into jar engaging position, the bottom surface of the collar will come into contact with the finish of the jar before the fingers 18 reach the level of shoulders 22 and as the assembly continues to be lowered the ring is yieldably retracted while the fingers proceed to their lower limit position as shown in FIG. 1. This action of the ring tends to level a jar before it is picked up unless there is some underlying obstruction beneath the jar preventing such leveling action. Also, since the bottom surface of the ring is preferably beveled in an upward and radially outward direction it tends to center the jar in axial alignment with the axis of the pick-up assembly.

When the fingers have reached their lower limit position the compressed air supply is turned on to open the fingers to their expanded position wherein the pick-up noses engage the interior surface of the jar slightly below the shoulder 22 as shown in FIG. 1. As the assembly now starts to rise, the spring loaded ring 25, which is now in a retracted condition bearing on the jar finish, retains the jar seated within the case until the pick-up noses 18 reach the shoulder 22 of the jar to start the actual withdrawal of the jar from the case or carton. The ring retains the shoulder in firm seated relation to the noses of the lifting fingers as shown in FIG. 3 thus providing stability for the jar as it is withdrawn and subsequently transported by the unloading apparatus, preventing the jar from impacting with adjacent jars while being carried by the mechanism. In the event a jar is tilted while in the shipping case for reasons which cannot be corrected prior to being lifted from the case, it will be seen that the action of the stabilizing ring in yieldably pressing a jar into seated relation with the pick-up noses 18 will operate to correct a tilted condition at the beginning of the jar's withdrawal from the shipping case and before withdrawal has been completed.

It will be seen that the ring 25 by bearing on the finish of a jar and the pick-up noses 18 by bearing on an interior shoulder surface of a jar cooperate essentially in a clamping manner with respect to the neck of the jar to achieve a secure gripping engagement thereof. Since the ring is in engagement with the entire circumference of the jars finish, any possible rocking motion of the jar about its fulcrum point of contact with the lifting fingers, from external forces of whatever sort encountered in the unloading operation, is avoided. The mechanism provides complete stability to the jars by reason of the clamp-like grip thereon during the entire course of the unloading operation and until the jars are deposited at a receiving station, whereupon the compressed air supply is shut off to retract the pick-up fingers and the assembly is lifted out of the jar and returned to its original location in preparation for another unloading operation.

While there has been shown and described what is considered to be a preferred embodiment of the invention, it should be understood that modification in form and detail can be made without departing from the spirit or essence of the invention. It is therefore intended that the invention be not limited to the exact form and detail herein shown and described nor to anything less than the whole of the invention as hereinafter claimed.

I claim:

1. A jar pick-up assembly adaptable for use with case unloading apparatus and operable for gripping and holding upon mouth jars while being lifted from a case and transferred to another location, said assembly including a shell type housing movable vertically relative to a jar to be picked up and having an actuator reciprocally operable therein, a plurality of elongate opposed finger-like members pivotally attached to and depending from said housing, said members being actuable by said actuator to rock the lower portions thereof from a closed abutting position to an open expended position, said lower portions when closed being transportable through the mouth of a jar by the movement of said housing and when expanded within a jar being urged into bearing contact with opposed interior surface areas thereof, and an annular stabilizing member carried by said housing and disposed around the lower extremities of said finger-like members in a horizontal plane to yieldingly engage an external surface area of said jar while said finger-like members are engaging said interior surface thereof, said finger-like members and said stabilizing member coacting to grip said jar therebetween and provide stability therefor while being lifted and transferred by said assembly from one location to another, said stabilizing member being supported by a plurality of headed pins slide fitted in said housing and yieldingly extended relative thereto by a spring fitted therebetween.

2. The invention according to claim 1 wherein said stabilizing member when extended is disposed to engage the finish of said jar as said finger-like members are being lowered through the mouth of said jar.

3. The invention according to claim 1 wherein the lower surface of said stabilizing member is beveled in an upward and radially outward direction to align said jar with said housing when lowered into contact with the finish of said jar.

4. The invention according to claim 1 adapted for jars having a shoulder-like formation in the side wall thereof and wherein the lower extremities of said finger-like members are formed with a jar engaging protuberance shaped to conform to the shape of said shoulder-like formation.

5. The invention according to claim 4 wherein the axial distance between the bottom surface of said stabilizing member and the protuberances on the extremities of said finger-like members is less than the axial distance between the finish of said jar and the shoulder-like formation in the side wall thereof.

6. The invention according to claim 5 wherein the protuberances on each of said finger-like members when in the expanded condition are an equal distance radially from the vertical axis of said housing and in a common plane perpendicular thereto, said stabilizing member yieldingly maintaining the shoulder-like formation of a jar in seated engagement with said protuberances to render said jar stable and aligned with said housing.

7. The invention according to claim 4 wherein the diameter of said stabilizing member is substantially equal to that of the jar finish, said member bearing on the entire periphery of said finish when in gripping engagement with the jar in cooperation with said finger-like members.

* * * * *